United States Patent
Hansen et al.

(10) Patent No.: US 9,662,706 B2
(45) Date of Patent: May 30, 2017

(54) LINING PLATE FOR LINING OF MOULDING CHAMBERS OF MOULDING MACHINES

(75) Inventors: Torben Hansen, Copenhagen (DK); Allan Joergensen, Vallensbaek (DK); Mogens Hansen, Vanloese (DK)

(73) Assignee: DISA INDUSTRIES A/S, Herlev (DK)

( * ) Notice: Subject to any disclaimer, the term of this patent is extended or adjusted under 35 U.S.C. 154(b) by 0 days.

(21) Appl. No.: 13/121,735

(22) PCT Filed: Oct. 6, 2008

(86) PCT No.: PCT/IB2008/002631
§ 371 (c)(1),
(2), (4) Date: Aug. 15, 2011

(87) PCT Pub. No.: WO2010/041091
PCT Pub. Date: Apr. 15, 2010

(65) Prior Publication Data
US 2011/0290981 A1    Dec. 1, 2011

(51) Int. Cl.
*B22C 11/02* (2006.01)
*B29C 39/10* (2006.01)
(Continued)

(52) U.S. Cl.
CPC .............. *B22C 11/02* (2013.01); *B22C 11/10* (2013.01); *B22C 15/00* (2013.01); *B22C 19/00* (2013.01); *B29C 39/10* (2013.01); *B29C 39/123* (2013.01)

(58) Field of Classification Search
CPC ......... B22C 11/02; B22C 15/00; B22C 19/00; B22C 9/00; B22C 9/20; B22C 11/10; B29C 39/10; B29C 39/123
(Continued)

(56) References Cited

U.S. PATENT DOCUMENTS 3,325,303 A * 6/1967 Teague et al. ................ 428/325
3,420,733 A * 1/1969 Hayase et al. ............... 428/336
(Continued)

FOREIGN PATENT DOCUMENTS

DE       3319463 A1 * 11/1984 ............ B22C 19/00
DE       87 14 510       1/1988
(Continued)

OTHER PUBLICATIONS

Translation of EP 0661121.*
(Continued)

*Primary Examiner* — Matthew Daniels
*Assistant Examiner* — Leith S Shafi
(74) *Attorney, Agent, or Firm* — Marvin Petry; Stites & Harbison PLLC

(57) ABSTRACT

A lining plate for lining a mould chamber in a sand molding machine. A base unit, is equipped with functional openings for injection of particle material, an air exhaust and fasteners. A layer of a synthetic resin material which is cast integrally onto the base unit faces the abrasive areas of said mould chamber. A method of manufacturing a lining plate comprising a base unit equipped with functional openings for injection of particle material, and/or air exhaust openings and fasteners. A method of refurbishing a lining plate in a sand molding machine comprising a base unit equipped with functional openings for injection of particle material, air exhaust openings and fasteners.

2 Claims, 4 Drawing Sheets

(51) Int. Cl.
  *B29C 39/12* (2006.01)
  *B22C 11/10* (2006.01)
  *B22C 15/00* (2006.01)
  *B22C 19/00* (2006.01)

(58) Field of Classification Search
  USPC ..... 164/21, 40, 159, 186–188, 33, 322, 195, 164/377, 237; 249/102, 112–116, 125, 249/134, 135; 425/183–185, 190, 192 R; 264/219, 225, DIG. 42, 338, 510, 516, 264/513, 35, 259, 279, 271.1, DIG. 64; 427/134, 133, 207.1
  See application file for complete search history.

(56) References Cited

U.S. PATENT DOCUMENTS

| | | | | |
|---|---|---|---|---|
| 3,544,400 | A * | 12/1970 | Deutsch | 216/42 |
| 3,734,163 | A * | 5/1973 | Larkin | 164/187 |
| 3,999,594 | A * | 12/1976 | Gunnergaard | 164/187 |
| 4,050,865 | A * | 9/1977 | Drostholm et al. | 425/183 |
| 4,115,507 | A * | 9/1978 | Pico | B07B 1/4618 264/267 |
| 4,460,629 | A * | 7/1984 | Haraga et al. | 427/221 |
| 4,478,779 | A * | 10/1984 | Russell et al. | 264/319 |
| 4,518,031 | A * | 5/1985 | Yamanishi et al. | 164/526 |
| 4,592,887 | A * | 6/1986 | Bando et al. | 264/337 |
| 4,857,368 | A * | 8/1989 | Klein | 427/393 |
| 4,997,025 | A | 3/1991 | Post et al. | |
| 5,246,058 | A * | 9/1993 | Murata | 164/182 |
| 5,679,380 | A * | 10/1997 | Munz et al. | 425/67 |
| 5,967,221 | A * | 10/1999 | Persson | B22C 11/02 164/159 |
| 6,027,057 | A | 2/2000 | Miles | |
| 6,189,280 | B1 * | 2/2001 | Malmberg | 52/506.05 |
| 6,303,241 | B1 * | 10/2001 | Miles | 428/812 |
| 6,463,993 | B1 * | 10/2002 | Cle Nogueras et al. | 164/322 |
| 6,743,466 | B2 * | 6/2004 | Flosbach et al. | 427/142 |
| 6,783,768 | B1 * | 8/2004 | Brown et al. | 424/443 |
| 7,267,157 | B2 * | 9/2007 | Ohtaki et al. | 164/180 |
| 7,762,307 | B2 | 7/2010 | Harada et al. | |
| 7,784,526 | B2 | 8/2010 | Harada et al. | |
| 2003/0011106 | A1 * | 1/2003 | Osaki | 264/401 |
| 2004/0091632 | A1 * | 5/2004 | Matsunami et al. | 427/457 |
| 2008/0032136 | A1 * | 2/2008 | Vissing et al. | 428/411.1 |
| 2011/0081437 | A1 * | 4/2011 | Felker | 425/129.1 |

FOREIGN PATENT DOCUMENTS

| | | | |
|---|---|---|---|
| DE | 89 06289 | 10/1989 | |
| DE | 3916532 C1 * | 2/1990 | B22C 11/10 |
| EP | 0 661 121 | 7/1995 | |
| EP | 0 665 100 | 8/1995 | |
| EP | 1149645 A1 * | 10/2001 | B22C 11/10 |
| GB | 1292330 A * | 10/1972 | B05D 1/36 |
| JP | 60-52316 A * | 3/1985 | B29C 39/10 |
| JP | 62057867 A * | 3/1987 | B24B 37/00 |
| WO | WO 00/76691 | 12/2000 | |
| WO | WO 2009074838 A1 * | 6/2009 | B22C 9/20 |

OTHER PUBLICATIONS

Translation of EP 0665100.*
Polyurethan Wear plate, published by San Diego Plastics, Inc. (date is not applicable).*
Machine translation of JP 60-52316 (Date is not applicable).*
International Search Report for PCT/IB2008/002631.
Written Opinion of the International Searching Authority for PCT/IB2008/002631.
International Preliminary Report on Patentability for PCT/IB2008/002631.

* cited by examiner

A-A

LINING PLATE FOR LINING OF MOULDING CHAMBERS OF MOULDING MACHINES

FIELD OF INVENTION

The present invention concerns a lining plate for lining a mould chamber in a sand moulding machine.

PRIOR ART

From EP 0 665 100 a sandwich construction composed of a base plate and a wearable part is known. The wearable part is a thinner ceramic or metallic layer adhered to a base plate by means of a polymeric woven adhesive material in order to compensate for variations in coefficient of expansion of the materials involved. Variations in expansion might lead to problems in tightness along borders, and the weight of this type of lining plate makes field replacement troublesome. Accordingly, when claiming high precision on thickness of the adhesive layer, joining three layers can cause intolerable variations in thickness of the complete plate.

In U.S. Pat. No. 4,997,025 a wear plate is detachably fixated to a carrier plate by means of magnetic force and mechanical securing means. This type of fixation is however possible only for materials with magnetic properties, and manufacture of the wear part is still subject to extensive efforts.

From EP 1 135 311 it is known to compose a sandwich plate of different types of material such as resins and metallic materials, but in this case magnets are embedded in the resin material, thereby making the composition more complicated in terms of manufacturing.

From EP 0 969 938 it is known to provide a detachable fixation of a wear plate in a moulding machine, said detachable fixation comprising studs permanently secured to one component in said moulding machine and the heads on the studs cooperating with engagement flanges in keyhole-like recesses.

It is also known to cast-on a synthetic resin on a complete moulding chamber or flask, but this method suffers from expensive mould tools and complicated machining after the cast-on moulding. Moreover, it is difficult to replace the resin in situ.

SUMMARY OF THE INVENTION

According to the present invention, a new lining plate is provided, said lining plate comprising a surface intended to face the mould chamber, and wherein said surface, intended to face the mould chamber, is formed of a synthetic resin material. Preferably, the lining plate comprises a base unit and a cover layer of a synthetic resin material being adhered to said base unit. The resin material is oriented against the abrasive areas of the mould chamber, hereby acting as a wear layer. The preferred base unit is produced to final dimensions for said base unit and equipped with possible functional openings, bushings and/or fittings for fixation in a moulding chamber, etc. before the resin material layer is adhered thereto. The synthetic resin surface may be casted to the final shape and tolerance or, if necessary, machined to the final shape and tolerance for the complete lining place after the adhesion.

The present lining plate has the advantages of both a single layer lining plate and a sandwich type of lining plate. Among the several advantages by the present invention are the same necessary narrow tolerances on thickness and parallelism as a single layer lining plate, so that sand moulds are easily expelled and lines up perfectly, where this is of importance. The narrow tolerances also make field replacement of only one or more lining plates possible. Absolutely no displacement is possible between the layers, since the synthetic resin material is cast onto and possibly over the edges of the base plate, and this together with the flexibility of the resin material, brings about very good tightness for particle material along the borders of the moulding chamber. Due to the considerable lighter weight of synthetic resin materials than that of metallic materials, the lining plate is more suitable in transportation and field replacement. Refurbishment of the lining plate to its full potential is easy and cost-effective since the wear layer can be stripped-off the base unit and the cast-on process redone whereby reusing a substantial part of the lining plate.

The lining plate in accordance with the present invention may be used for both match-plate and vertical moulding machines. Furthermore, a resin layer may also be provided as a wear layer in the sand shooting slot and associated surfaces subjected to wear from the sand.

DESCRIPTION OF THE DRAWINGS

The invention will be explained in more detail with reference to the accompanying drawings, in which

In FIG. 4 a lining plate 10 is constructed by machining a metallic base unit 11 with all functional openings for particle material inlet 16 and exhaust 7 by preparations for air and/or spray nozzles 27 together with machine-dependent fastening means 26 for fixation onto the boundaries of the moulding chamber. The finished base unit 11 is prepared for cast on of a synthetic resin by mounting in a casting tool intended for this purpose. The resin is cast onto the base unit and cured. Simultaneously, it is ensured that no relative displacement between the layers can take place. After the cast-on process the hereby-created lining plate 10 with a wear layer 12 is machined if necessary to the final shape and tolerance. Functional openings in the wear layer 12 corresponding to those in the base unit 11 are machined if necessary, and exhaust nozzles 27 are possibly inserted.

ONE PREFERRED EMBODIMENT

Sand moulds are often used in industrial casting of complex shaped metal products. Automatic machines or techniques for making sand moulds are known. Basically, most types of moulding machines comprise a sand filling and a squeezing section for the moulding of sand moulds. Two types of machines are shown in FIG. 1 and FIG. 2 and will be described in more details in the following.

Figure 1:
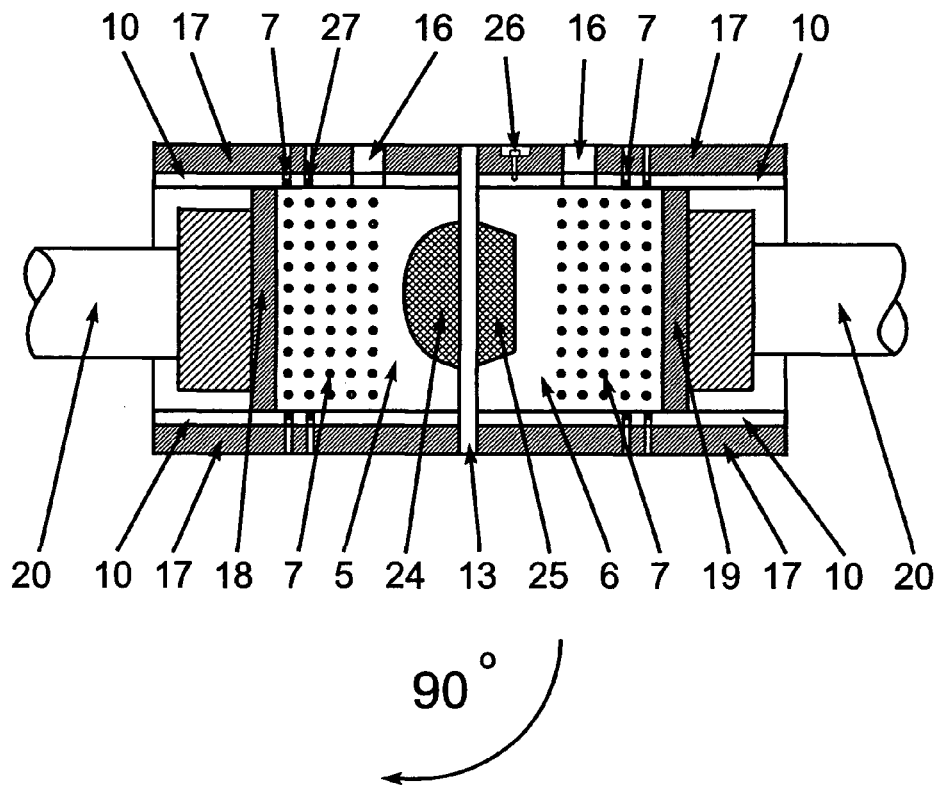
FIG. 1 is a lateral, sectional view of the schematically shown sand blowing and squeezing section of a machine performing the match-plate technique in the sand blowing and squeezing cycle position.

In a moulding machine operating by the match-plate technique shown in FIG. 1, the sand filling and squeezing section comprises an upper and a lower moulding chamber 5 and 6, respectively, also known as a cope and drag flask fixed to and guided by a guiding and moving arrangement (not shown). By the activation of the guiding and moving arrangement, the moulding chambers may be moved in the direction towards each other or in a direction away from each other. A press arrangement 20 comprises an arrangement for moving the cope squeeze plate 18 and the drag squeeze plate 19 against each other and away from each other in an independent way of the movement of the moulding chambers. In this embodiment, the press arrangement 20 together with the complete sand filling and squeezing section can be rotated 90 degrees into a position orthogonal to the position shown in FIG. 1. In this position, insertion and removal of the match plate, assembly of the respective upper and lower sand mould part and ejection of the complete sand mould take place. A match plate 13 having oppositely arranged patterns 24-25 is clamped between the moulding chambers 5-6 so that the patterns 24-25 are extending into each moulding chamber 5-6 during moulding. While the match plate 13 is in the sand filling or shot position, the sand is blown or shot with an excess amount of air through slit-shaped openings 16 simultaneously into each of the moulding chambers 5-6. The air escapes through the venting holes 7, which are formed to filter out the sand material. After the sand blow cycle, the press arrangement 20 moves the cope squeeze plate 18 and the drag squeeze plate 19 against the match plate 13 and hence against each other. During the squeezing cycle the sand material in each of the moulding chambers is compacted, and this creates an impression of the patterns 24-25, respectively, in each of the sand mould parts. The pressure thus created, acting against the circumferential walls 17 of each of the moulding chambers in connection with the relative movements between the sand material and said walls, creates abrasive wear on the lining plates 10 in the moulding chambers and consumes a great deal of energy. Also the sand blowing creates abrasive wear on the lining plates 10 and on the slit-shaped openings 16 and associated surfaces.

Figure 2:
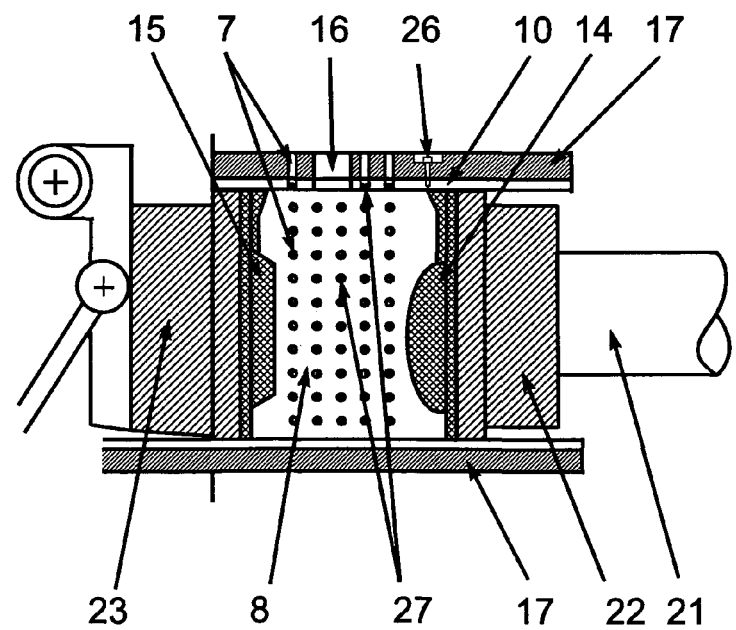
FIG. 2 is a lateral, sectional view of the schematically shown sand blowing and squeezing section of a vertical mould forming.

In a moulding machine operating by the vertical moulding technique shown in FIG. 2, the sand blowing and squeezing section—in contrast to the match-plate technique—comprises one moulding chamber 8 only. The moulding chamber 8 is delimited by a circumferential set of walls on the three sides and a bottom plate. Moreover, the moulding chamber is delimited by the first and second pattern plates 14-15 supported by the squeeze plates 22-23. While the squeeze plates 22-23 are held in place, sand is blown or shot with an excess amount of air through a slit-shaped opening 16 into the moulding chamber 8. The air escapes through the exhaust openings 7, which have been equipped with exhaust nozzles 27 to filter out the sand material. After the sand blowing sequence, the pressing piston 21 moves the squeeze plate 22, which supports the pattern plate 14, and the swingable squeeze plate 23, which supports the pattern plate 15, moves into the chamber and compacts the sand in the moulding chamber. During the squeeze operation, the sand material in the moulding chamber 8 is compacted, and this creates an impression of the patterns plates 14-15 in the respective opposite ends of the sand mould. After compacting, the swingable squeeze plate 23 is swung upwards, thereby opening the moulding chamber. The pressing piston 21 pushes the compacted sand mould part into intimate contact with a string of corresponding moulds previously produced, whereby a cavity for sand mould casting is provided between successive moulds at the vertical parting surface between these moulds. The pressure created during squeezing acting against the circumferential walls 17 of the moulding chamber in connection with the relative movements between the sand material and said walls creates abrasive wear on the lining plates 10 in the moulding chamber 8, and the ejection sequence with a highly compacted mould creates abrasive wear and consumes a great deal of energy. Also the sand blowing creates abrasive wear on the surfaces in contact with the sand during the sand shot.

Figure 4:
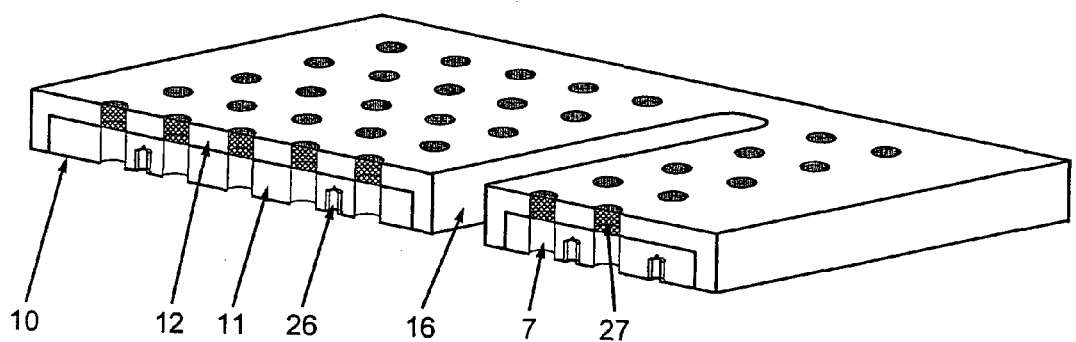
FIG. 4 is a cross-sectional view of a lining plate with a wear layer over the edge of the base unit.
Figure 5:
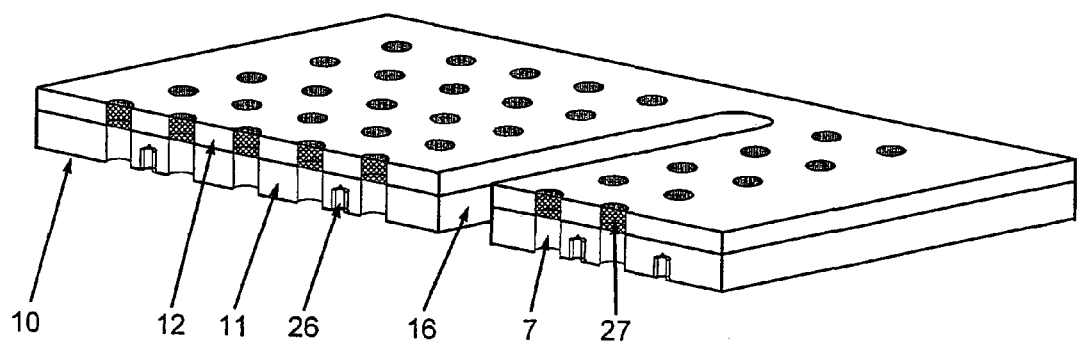
FIG. 5 is a cross-sectional view of a lining plate without the wear layer over the edges of the base unit, and FIG. 6A, FIG. 6B

In the preferred embodiment shown in FIG. 4 and FIG. 5, a machine type-dependent base unit 11 is manufactured with all functional openings for air exhaust 7 and/or spray nozzles 27 and, if applicable, a slit-shaped opening for blow-in of particle material 16. Air exhaust openings 7 can be prepared for exhaust nozzles 27 or the like. The base unit 11 is positioned in a casting tool for resin casting. A wear layer 12 of e.g. polyurethane in liquid form is cast onto the base unit as shown in FIG. 5 and possibly around corners of the base plate as shown in FIG. 4. After curing, i.e hardening, the polyurethane wear layer 12 is machined if necessary for final surface quality and tolerance for thickness and parallelism of the complete sandwich-like lining plate 10 in a traditional, but due to the nature of polyurethane material, specialized way. For the purpose of air exhaust openings 7, exhaust nozzles 27 are provided. Moreover a slit-shaped opening 16 for blow in of particle material 16 is provided in the upper part of the chamber, corresponding to the holes in the base unit 11 for communication through layers. Advantageously, also the surfaces of the sand shot system may be provided with a wear layer.

Figure 3A:
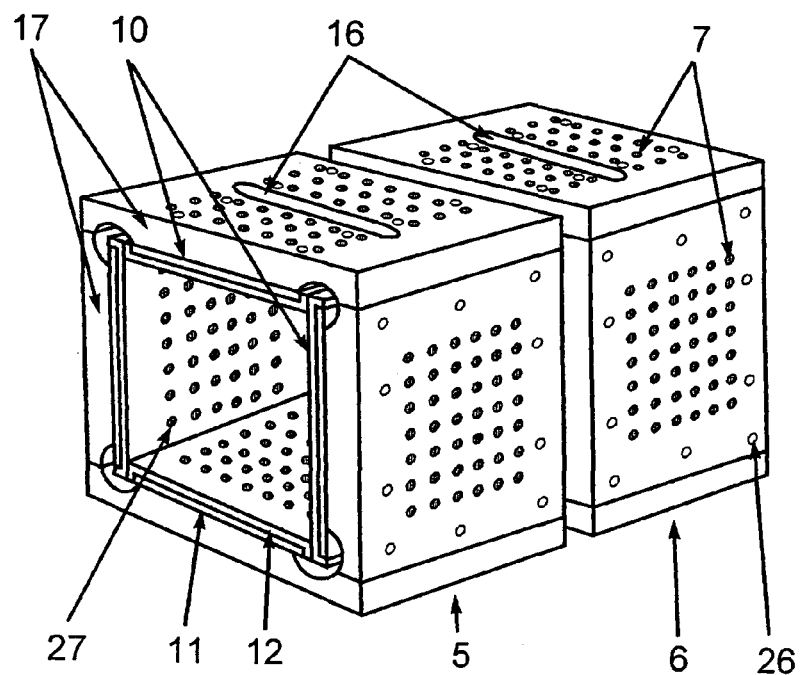
FIG. 3A and FIG. 3B shows an isometric view into moulding chambers of the match-plate and the vertical moulding technique type, respectively, where the lining plates of the vertical moulding technique type are shown outside the chamber, and showing the moulding machines equipped with lining plates according to the invention.
Figure 3B:
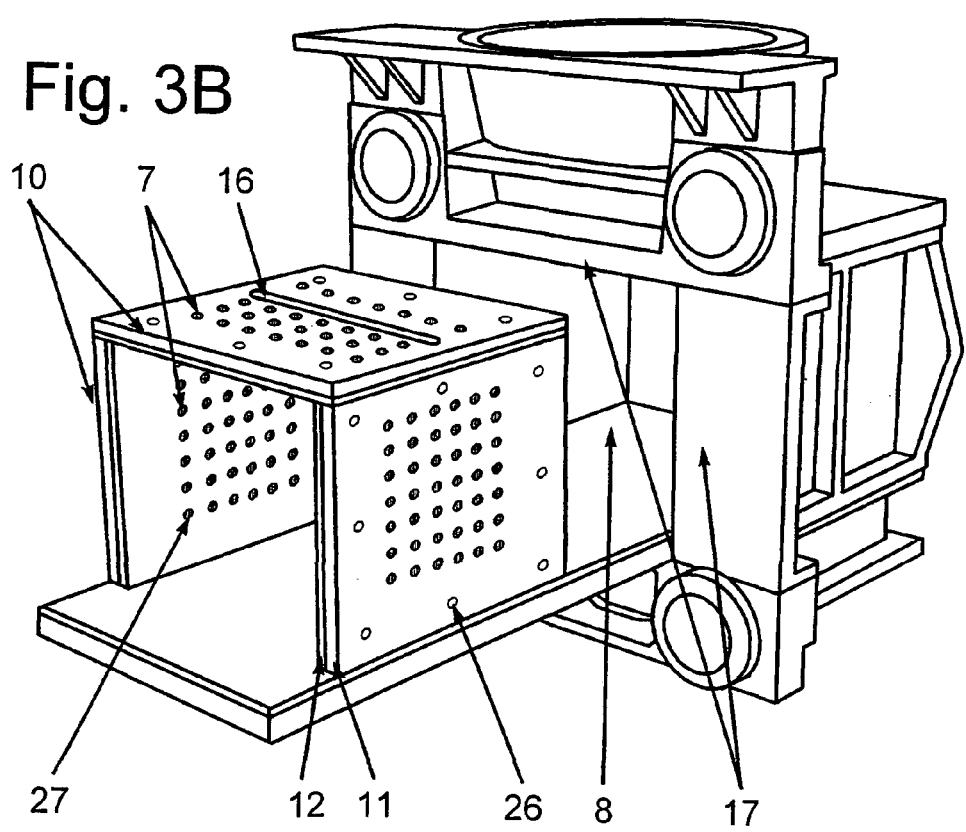

A moulding chamber for the match-plate and vertical moulding technique type of moulding machine, respectively, is shown in FIG. 3A and FIG. 3B, each equipped with lining plates according to the invention, however the same principles will apply to moulding chambers for the different types of machines. In FIG. 3B the moulding chamber compartment 8 is intended to be equipped with the lining plates 10 shown outside the chamber. In FIG. 4 and FIG. 5 it can be seen how the border arrangement of adjacent lining plates may be provided with a layer of synthetic resin and possibly provides a flexible contact between adjacent lining plates. The flexible properties of polyurethane allows slightly oversizing of plates, which in turn facilitates installation and replacement and creates particle material-tight borderlines.

Figure 6A:
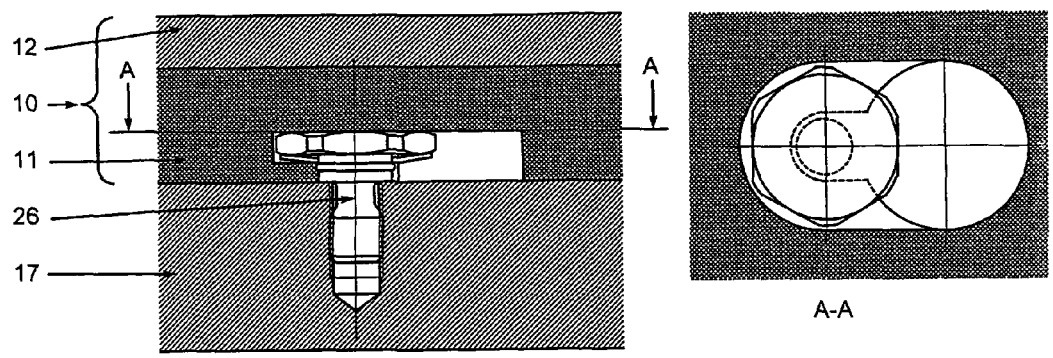
FIG. 6C is a cross-sectional view lining plates showing examples of the fastening means.
Figure 6B:
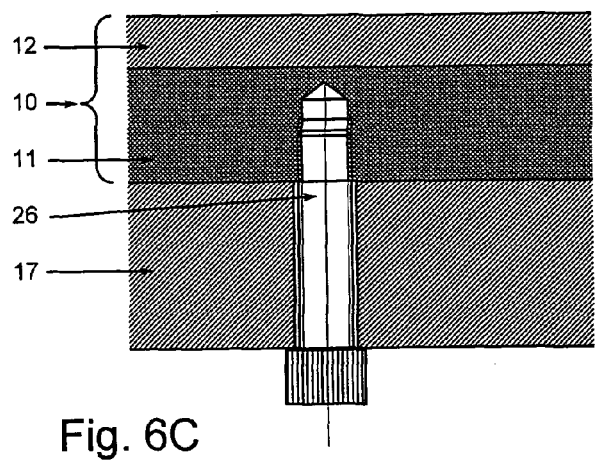
Figure 6C:
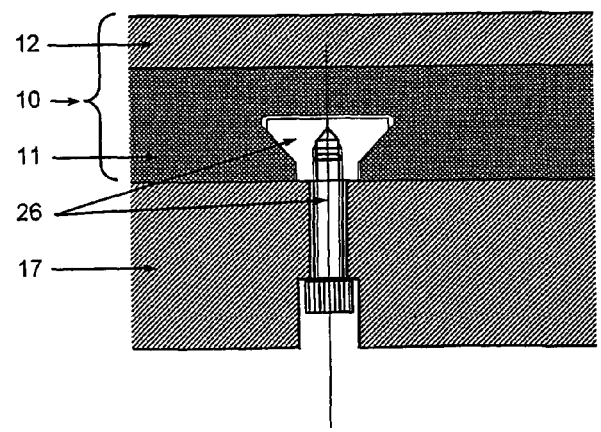

As shown in FIG. 6A, 6B and 6C, different possibilities of fixation of the lining plates 10 in the moulding machine are shown. In FIG. 6A the fixation comprises a stud with a head 26 mounted on one of the circumferential walls 17 of the moulding chamber. The head of the stud 26 cooperates with a keyhole opening in the base unit 11 in order to provide a releasable connection with the circumferential wall 17 and lining plate 10.

Correspondingly, FIG. 6B shows the fixation of the lining plate 10 to the circumferential wall 17 by means of a screw connection 26.

In FIG. 6C the connection between the circumferential wall 17 and the lining plate 10 is provided by means of a combination of a screw and an insert 26 cooperating with an opening provided in the base unit 11.

Above, the invention has been described with reference to preferred embodiments thereof, however a person skilled in the art will be able to envisage other embodiments without departing from the following claims. Among such variations, the provision of the base unit 11 of another material than metallic, e.g. plastic, cast resin, composite fibre-reinforced material, or the like, could be envisaged. Furthermore, the provision of a wear layer on other surfaces than the mould chamber surfaces is possible.

The invention claimed is:

1. A method of manufacturing a lining for a mould chamber in a sand moulding machine, which lining comprises a metallic base plate and a synthetic resin wear layer, comprising the steps of:

providing a casting tool, placing the metallic base plate, which has functional openings therethrough, into the casting tool, introducing a liquid synthetic resin into the casting tool onto the base plate such that the resin forms said wear layer on the metallic base plate, curing the synthetic resin wear layer on the metallic base plate until it hardens and is integral with the metallic base plate, and machining the cured synthetic resin wear layer to provide functional openings therein corresponding with the said functional openings in the metallic base plate and to provide final surface quality and tolerances for thickness and parallelism of the complete lining.

2. A method according to claim 1, including fastening the metallic base plate to the moulding machine by fasteners.

* * * * *